United States Patent

[11] 3,576,334

[72] Inventor James Frederick Hemens
 Redhill, Surrey, England
[21] Appl. No. 794,568
[22] Filed Jan. 28, 1969
[45] Patented Apr. 27, 1971
[73] Assignee Arens Controls Limited
 Redhill, Surrey, England
[32] Priority Mar. 5, 1968
[33] Great Britain
[31] 10,684/68

[54] FLEXIBLE CABLE CONDUIT JOINTS
 3 Claims, 1 Drawing Fig.

[52] U.S. Cl. .................................................. 285/149,
 174/88, 285/322, 285/341
[51] Int. Cl. ...................................................... F16l 39/00
[50] Field of Search .......................................... 285/133,
 382.7, 149, 341, 322, 323, 138; 334/89, 270;
 174/88.2, 88

[56] References Cited
 UNITED STATES PATENTS
 2,173,643 9/1939 Moser .......................... 174/88.2
 2,522,785 9/1950 Hanson ....................... 285/382.7X
 3,245,700 4/1966 Appleton..................... 285/149
 FOREIGN PATENTS
 969,600 7/1958 Germany...................... 285/149
 930,096 7/1963 Great Britain................ 174/88.2
 1,022,288 3/1966 Great Britain................ 174/75.2

Primary Examiner—Dave W. Arola
Attorney—Dowell and Dowell

ABSTRACT: A joint coupling is provided for a flexible cable conduit, which conduit has an inner case and an outer coaxial sheath. The coupling comprises a two-part collet the two parts of which are of different diameters and are disposed in axially consecutive relationship, the part of smaller diameter being lodged in an externally threaded union while the larger diameter part is lodged in a nut received by the union. The collet parts and the union and nut have cooperating conical faces so that as the nut is screwed on to the union both collet parts are contracted.

PATENTED APR 27 1971 3,576,334
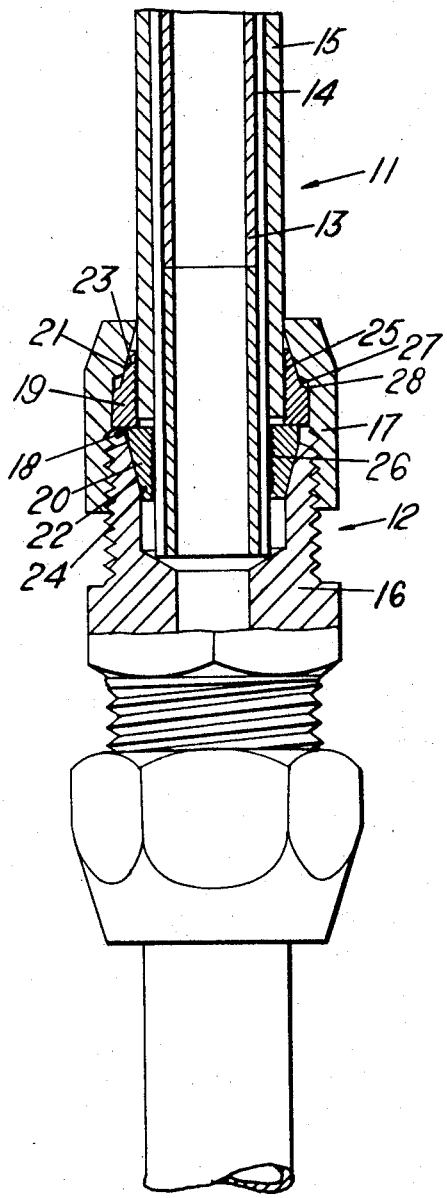

FLEXIBLE CABLE CONDUIT JOINTS

This invention relates to the jointing of conduit, more particularly conduit having a composite construction where one conduit case is disposed concentrically within another case. The two conduit cases are normally employed to fulfill different functional requirements of the integrated assembly.

One use of this type of conduit is in mechanical remote control transmission cables wherein the mechanical effort is transmitted by an inner cable wire guided by the surrounding conduit. Such conduit may comprise a liner tube encircled by a helix of high tensile wires wound in a relatively long lay about the liner tube. These high tensile wires are retained in place by a plastic casing which is extruded in the form of a concentric sheath.

One object of the invention is to provide a double collet assembly, the collets being disposed end to end with their larger ends contiguous, one collet gripping the lay wires and being contracted by forcing into a conical mouth of a union member, while the other collet of larger diameter grips the plastic sheathing and is contracted by a conical portion of the bore of a nut which also has a screw threaded portion of its bore engaging external screw threading on the union member. When the nut is screwed on to the union member both collets are contracted simultaneously. An important feature is that a shoulder on the collet of larger diameter constitutes a stop abutment cooperating with an internal shoulder in the nut to limit axial relative movement of the collet and nut in the direction contracting the collet. This means that the larger diameter collet gripping the plastic sheathing is only contracted to a certain predetermined limited extent, whereafter further screwing of the nut on to the union member further contracts the small diameter collet gripping the conduit lay wires, by reason of the end to end engagement of the two collets, but does not any further contract the larger diameter collet gripping the plastic sheathing. This enables any desired gripping force to be applied between the smaller diameter collet and the lay wires without the gripping force between the larger diameter collet and the plastic sheathing being increased to the point where the softer sheathing will be injured.

An object of the present invention is to provide a secure coupling means which is capable of being assembled in the field without special tools.

According to the invention, a conduit coupling comprises a radially contracting collet assembly having a stepped internal diameter such that two concentric conduits are simultaneously gripped by the two portions of the collet of different diameters. Such a collet can be made up of two parts of different nominal internal diameters disposed end to end. In the case of the cable conduit described, the part of smaller internal diameter grips the long lay wires while the part of larger internal diameter grips the outer plastic sheathing.

Preferably, the larger part of the collet is provided with an external abutment to limit the extent of its radial contraction. Either the larger or the smaller part, or both, may be formed internally with an axially discontinuous surface, for example like a truncated thread form, to improve its grip.

One form of construction in accordance with the invention is illustrated by way of example in the accompanying drawing, which shows, in partial longitudinal section, a cable conduit joint.

In the drawing, a conduit 11 for a mechanical transmission cable is received in one end of a double-ended coupling assembly 12. The cable conduit comprises an inner liner tube 13, a long lay of helical wires 14 and an outer plastic sheathing 15. The coupling assembly comprises an externally threaded union member 16 on which is received a nut 17; a double collet assembly 18 to grip the conduit 11 is housed within the end of the union 16 and the nut 17.

The collet assembly comprises two axially consecutive parts 19, 20 of different nominal diameters arranged back to back in contiguity. The larger diameter part 19 lies beyond the union 16 and within the nut 17, while the smaller diameter part 20 is within the end of the union member. The two parts of the collet have external conical surfaces 21, 22 of opposite slope and these cooperate, respectively, with internal coned surfaces 23, 24 in the nut and the union whereby when the nut is screwed farther on to the union end both portions of the collet are contracted simultaneously.

The inner tube 13 and surrounding wires 14 of the conduit 11 extend into the union member 16 so as to be gripped by the collet part 20 of the smaller diameter, but the outer plastic sheathing 15 of the conduit is trimmed back so that it stops short of the end of the union member 16 and only enters the nut 17 to be gripped by the collet part 19 of larger diameter. Both portions of the collet have axially discontinuous internal surfaces in the form of truncated thread forms, as shown at 25 and 26, the thread form in the smaller diameter part 20 being deeper than that in the larger diameter part 19.

The nut 17 has an internal shoulder 27 which engages an external abutment surface 28 on the collet part 19 for positively limiting radial contraction of this part of the collet.

I claim:

1. A conduit joint assembly for a flexible mechanical transmission cable, comprising in combination: a flexible conduit having an inner liner tube, a lay of helical wires around said liner tube, and an outer plastic sheathing covering said lay of helical wires, said conduit further having a bared end portion formed by said liner tube and said lay of helical wires protruding together beyond the end of said plastic sheathing, an externally screw-threaded union member having an axially-extending bore receiving within it said bared end portion of said conduit which union member bore is formed with an entry mouth which diverges conically up to the end of said bore at which said bared end portion of said conduit enters it, a nut which is internally screw-threaded for only a part of its length extending up to one end thereof said nut being disposed with the non-screw-threaded part of its length surrounding an end portion of said plastic sheathing of said conduit and with the screw-threaded part of its length extending into overlapping screwed engagement with said externally screw-threaded union member, said nonscrew-threaded portion of said nut length surrounding said plastic sheathing being formed internally with a conically increasing bore section that diverges in the opposite axial direction to the divergent mouth of said union member bore, said conically increasing bore section of said nut terminating at its larger diameter end nearer said union member in a more abrupt increase in the internal diameter of said nut thereby forming an internal shoulder within said nut, first contractable collet means disposed in said union member divergent mouth around said bared end portion of said conduit and having a nominally cylindrical internal surface in engagement with said lay of helical wires of said conduit, said first collet means further having a conically enlarging outer surface contiguous with said conically divergent mouth of said union member bore, and second contractable collet means of larger internal diameter and larger maximum external diameter than said first collet means and disposed within said nut in contiguous end-to-end relationship with said first collet means, said second collet means having a nominally cylindrical internal surface in engagement with said plastic sheathing of said conduit, said second collet means further having a conically enlarging outer surface contiguous with said conically increasing bore section of said nut and terminating at its end of larger diameter in a more abrupt increase in the external diameter of said second collet means thereby forming an external shoulder on said second collet means lying between said internal shoulder on said nut and said first collet means and constituting in cooperation with said internal shoulder on said nut a stop abutment to limit relative axial movement of said nut and second collet means in the direction bringing about contraction of said second collet means.

2. A joint assembly according to claim 1, wherein said first collet means is formed internally with an axially discontinuous surface to improve its grip.

3. A joint assembly according to claim 1, wherein said second collet means is formed internally with an axially discontinuous surface to improve its grip.